United States Patent [19]

Teppo

[11] 3,855,094

[45] Dec. 17, 1974

[54] METHOD IN THE QUANTITATIVE AND QUALITATIVE DETERMINATION OF MOLECULES HAVING ANTIGENIC PROPERTIES BY IMMUNOELECTROPHORESIS

[75] Inventor: Anna Maija Teppo, Haukilahti, Finland

[73] Assignee: Orion-Yhtyma Oy, Helsinki, Finland

[22] Filed: Sept. 19, 1972

[21] Appl. No.: 290,381

[30] Foreign Application Priority Data
Sept. 24, 1971 Finland................................ 2678/71
Dec. 30, 1971 Sweden............................. 16888/71

[52] U.S. Cl.............................. 204/180 G, 204/299
[51] Int. Cl................................................ B01k 5/00
[58] Field of Search......... 204/180 S, 180 G, 180 R, 204/299; 260/112 B; 424/85

[56] References Cited
UNITED STATES PATENTS

| | | | |
|---|---|---|---|
| 2,630,414 | 3/1953 | Stoecker et al........................ | 260/6 |
| 2,761,810 | 9/1956 | Singher et al................... | 260/112 X |
| 3,558,459 | 1/1971 | Granstrand et al............. | 204/180 G |
| 3,607,695 | 9/1971 | Schneider........................ | 204/180 S |
| 3,639,559 | 2/1972 | Tax...................................... | 424/85 |

OTHER PUBLICATIONS

Colowick et al., "Methods in Enzymology," 1955, Vol. I, Academic Press, Inc., N.Y., pp. 82–85.

*Primary Examiner*—John H. Mack
*Assistant Examiner*—A. C. Prescott
*Attorney, Agent, or Firm*—Stevens, Davis, Miller & Mosher

[57] ABSTRACT

In immunoelectrophoresis a method of determining the presence of molecules having antigenic properties and such electrochemical characteristics that their net mobility does not appreciably deviate from the antigens directed against the antibodies or do not have sufficient net mobility to be determined satisfactorily by conventional methods. Determination of the molecules is effected by adding certain specified compounds to the test sample prior to the electrophoresis.

7 Claims, No Drawings

METHOD IN THE QUANTITATIVE AND QUALITATIVE DETERMINATION OF MOLECULES HAVING ANTIGENIC PROPERTIES BY IMMUNOELECTROPHORESIS

The present invention relates to a novel method of effecting immunoelectrophoretic determination of molecules having antigenic properties and containing free amino groups, preferably immunoglobulins.

Immunoelectrophoresis is normally carried out on an agar gel matrix, biological samples containing antigenic molecules against which precipitating antibodies are found available being separated in the matrix by electrophoresis. Other known substances such as starch gel, gelatin, cellulose acetate and acrylamide gel may be used for the matrix.

The most common type of immunoelecctrophoresis is effected on an agar gel matrix, wherewith a sample containing antigen is added to a buffered gel medium system and a voltage of 1–10 cm$^{-1}$ is applied to the matrix with the matrix in a horizontal position. After a certain length of time has passed, a groove is cut in the agar gel matrix and an adjusted quantity of anti-serum in placed in the groove. The anti-serum then diffuses in towards the different antigens in the direction of the antigen migration paths. When the antigens and anti-serum meet, a precipitation reaction takes place, which can be observed with the naked eye or, subsequent to washing away excess proteins and the like, can be visibilized by coloring the system.

Another very similar method is one known as the immunodiffusion technique developed by Mancini et al. (Immunochemistry, Pergamon Press 1965, page 235–254), in which anti-serum is mixed in the gel and the antigen permitted to diffuse from a bath cut in the gel. This technique is particularly used with quantitative determinations.

A further method, which can be referred to as a combination of immunoelectrophoresis and the immunodiffusion technique, has been proposed by Laurell (Analytic Biochemistry 15, pages 45–52 (1966)). According to this method, there is used a gel which already contains anti-serum. Gel plates containing specific antiserum or antibodies are prepared, and the sample is applied to the gel plate in suitable holes disposed in the gel layer, whereafter a voltage is applied to the plate for a determined length of time. By means of this method, it is possible to determine both qualitatively and quantitatively the content of the special antigen capable of reacting with the anti-serum present in the plate. The results obtained with this method are considerably more accurate than the determinations obtained with the Mancini method. Moreover, the method of Laurell is less time consuming than the method of Mancini.

When making electrophoretic determinations on, for example, blood serum using the Laurell method, certain difficulties arise owing to the fact that the gamma-globulins have but very slight mobility during electrophoresis. This is due to the fact that under normal test conditions many of the gamma globulins present a charge of such magnitude that when combined with the effect of the electroosmosis the result is a zero net mobility. This, of course, also applies to the antibodies inserted in the gel as the specific antiserum before the electrophoresis. For this reason, it is only with difficulty that the Laurell method can be used successfully in the determination of immunoglobulins in sera, since both these immunoglobulins and the immunoglobulins introduced into the gel have practically the same net mobility. It is eveness suitable to effect immunoelectrophoretic determinations in those instances when the mobility of the sample substances is lower than that of the antibodies in the gel plate.

For the purpose of solving this problem, attempts have been made to change the mobility of the antigen, by subjecting it to different treatment processes. Thus, attempts have been made to carbamylize immunoglobulin type antigens [Weeke, Scand. J. Clin. Lab. Invest. 21 page 351 (1968)]. This method requires a considerable length of time to effect, at least 18 hours at room temperature, besides requiring considerable skill on the part of the laboratory personnel, in order for a reproduceable result to be obtained. In another known method, β-propiolactone is used for the same purpose [Stephan and Frahm, Z. Klin. Chem. Klin. Biochem. 9 page 224 (1971)]. This method is also time consuming. However, further, the time required to change the mobility of, for example, human IgG to a sufficient degree depends greatly on the concentration of β-propiolactone in the solution and on the temperature. This dependency will be evident from Example 3 below.

Thus, it is evident that the positive charge on the immunoglobulins can be reduced with all compounds capable of reacting with the free amino groups in the immunoglobulins. The blockage of the free, primary amino groups caused by this reaction makes the compound less dissociatable. Thus, the use of aromatic carboxylic acid chlorides and sulphonic acid chlorides, phthalyl derivatives, such as phthalyl glycyl chloride, isothio-cyanates such as phenyl isothiocyanate, aromatic halogen derivatives, such as 2,4-dinitrofluorobenzene, anhydrides, such as succinic anhydride and ketenes can be conceivably used instead of the previously tried compounds, carbamide and β-propiolactone.

It has not been discovered, however, that the charge on the antigen molecules, particularly immunoglobulins such as IgM and IgG, can be changed in an advantageous manner. This charge can be effected on immunoglobulins irrespective or whether the antiserum is added to the system subsequent to electrophoresis or antibodies whether the antibodies are already found incorporated in the gel matrix.

The novel method of the present invention involves adding to the sample before electrophoresis a compound selected from the group

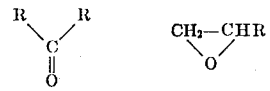

and

Where R is hydrogen or alkyl having one or two carbon atoms.

Among compounds which can be used to particular advantage are those with which R is hydrogen, formaldehyde and compounds which readily split off formaldehyde, such as paraformaldehyde, and ethylene oxide.

When effecting immunoelectrophoresis in accordance with the invention, the pH of system is suitably maintained between 5 and 10, a pH of between 8–9 being especially preferred.

The special advantage afforded by the method of the present invention resides in the fact that relatively large quantities of formaldehyde, for example, can be added to the sample, for instance quantities of the magnitude of at least 0.05 M, without negative effect. This results in a rapid conversion of the antigen molecule, often only 5 minutes being required for said conversion. The time taken to reach full activity is normally 30 minutes. This takes place without any risk of denaturization of sensitive proteins, such as immunoglobulins and without said globulins losing their antigen activity. By way of comparison it can be mentioned that carbamylation according to Weeke takes at least 18 hours and the β-propionlactone treatment process more than 6 hours at room temperature. In addition the activity is impaired when applying the known processes.

It is thus possible to obtain good quantitative results with the electrophoresis over periods of only some few hours, which, as will immediately be perceived, considerably improves on the known methods in the art and emphasizes the value of applying the novel method for the immunoelectrophoretic determination of special immunoglobulins.

The novel method of the invention can also be carried out by persons having no special qualifications and can thus be more readily included in routine tests carried out at hospitals or in research laboratories, as opposed to the more time consuming, complicated processes previously known to the art.

A better understanding of the method of the present invention will be had from the following examples. Although the examples relate to immunoglobulins it will be understood that the invention is not restricted thereto.

EXAMPLE 1

An immunoelectrophoresis was carried out on a thin layer of agarose gel containing antibodies against a known species of immunoglobulin (IgG) and placed on a glass plate.

The immunoglobulin sample was treated with different compounds within the framework of the compounds of the aforementioned formula.

The time taken to reach a stable mobility level during the immunoelectrophoresis was then determined at different time intervals. The results are shown in Table I. The test was carried out with human IgG at a pH of 8.6 and a concentration of respective compounds of 0.7 M and a temperature of 25°C.

| Compound | Reaction time to stable mobility (hours) |
|---|---|
| Formaldehyde | 0.25 |
| Acetaldehyde | 7 |
| Butylaldehyde | 18 |
| Propionaldehyde | 25 |

EXAMPLE 2

An immunoelectrophoresis was carried out in the same manner as that in Example 1, with the exception that the sample was treated with an ethylene oxide solution instead of the aldehydes. The concentration of ethylene oxide used is shown in the following table. The tests were carried out in a barbiturate buffer at pH 8.6 and at room temperature.

| Molar concentration of ethylene oxide | Time in hours to reach changed mobility of human IgG |
|---|---|
| 0.5 | >6 |
| 1.0 | 5 |
| 3.0 | 4 |

No marked changes in reactivity were obtained at the highest concentration, although a slightly reduced antigen activity was observed. The higher concentration of 3 M ethylene oxide during a period of 4 hours is to be preferred, however, owing to the time gain.

EXAMPLE 3

This test was made in order to compare the decrease in activity when using the previous known treatment methods with β-propiolactone. It can be mentioned in this respect that the compounds of the present invention did not lead to any substantial change in the activity. The tests were made in a phosphate buffer at pH 8.0.

| Mole concentration β-propiolactone | Temperature °C | Time hours | Loss in activity in percent |
|---|---|---|---|
| 0.04 | 37 | 4 | not observable |
| 0.04 | 25 | >8 | do. |
| 0.4 | 25 | >6 | do. |
| 2.0 | 25 | 2 | 70 % |
| 4.0 | 25 | 0.5 | 90 % |

What is claimed is:

1. An immunoelectrophoretic method of quantitatively and qualitatively determining the presence in a gel matrix of molecules which possess antigenic properties and contain free amino groups, comprising:
providing a gel matrix containing molecules whose properties are to be determined, said matrix comprising an environment which is stabilized against uncontrolled liquid convection in space, the electrochemical properties of said molecules being such that their net mobility does not appreciably deviate from the net mobility of antigens directed against antibodies in said matrix,
adding to said gel matrix containing said molecules a compound selected from the group consisting of:

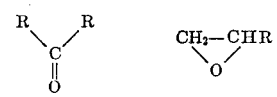

and where R is hydrogen or alkyl having not more than two carbon atoms,
and then passing an electric current through said gel matrix to transport immunoglobulins and therewith form precipitation zones.

2. The method of claim 1 wherein said compound is formaldehyde or paraformaldehyde.

3. The method of claim 1, wherein the pH of the matrix is maintained between 5 and 10.

4. The method of claim 3, wherein the pH of the matrix is maintained between 7.6 and 9.3.

5. The method of claim 1 wherein said matrix is provided by allowing a gel matrix sample to stand for at least 5 minutes at a temperature in the range of 0°–45°C before said molecules are added to said matrix.

6. The method of claim 2, wherein the concentration of said compound in the matrix is at least 0.05M.

7. The method of claim 1, wherein before said electric current is passed through said gel matrix, formaldehyde is added to said matrix to a concentration in the range of 0.5–1.5 M, while said matrix has a pH in the range of 7.9–8.9, and said matrix is allowed to stand for 15 minutes at a temperature in the range of 5°–30°C.

* * * * *